United States Patent
Iwami et al.

(10) Patent No.: US 9,821,618 B2
(45) Date of Patent: Nov. 21, 2017

(54) SUSPENSION SYSTEM

(71) Applicant: Kubota Corporation, Osaka-shi (JP)

(72) Inventors: Kenichi Iwami, Sakai (JP); Shigeki Hayashi, Sakai (JP); Akihiro Matsuzaki, Sakai (JP); Toshimitsu Yazaki, Sakai (JP); Atsushi Hayashi, Sakai (JP); Kazuma Ishihara, Sakai (JP)

(73) Assignee: Kubota Corporation, Osaka (JP)

( * ) Notice: Subject to any disclaimer, the term of this patent is extended or adjusted under 35 U.S.C. 154(b) by 311 days.

(21) Appl. No.: 14/684,712

(22) Filed: Apr. 13, 2015

(65) Prior Publication Data

US 2015/0246589 A1   Sep. 3, 2015

Related U.S. Application Data

(62) Division of application No. 12/674,963, filed as application No. PCT/JP2009/055983 on Mar. 25, 2009, now Pat. No. 9,020,698.

(30) Foreign Application Priority Data

Apr. 15, 2008   (JP) ................................. 2008-106153

(51) Int. Cl.
*B60G 17/00*  (2006.01)
*B60G 17/015*  (2006.01)
(Continued)

(52) U.S. Cl.
CPC ......... *B60G 17/0152* (2013.01); *B60G 9/022* (2013.01); *B60G 17/01933* (2013.01);
(Continued)

(58) Field of Classification Search
CPC .......... B60G 2400/252; B60G 2500/30; B60G 2400/204; B60G 17/015; B60G 17/016;
(Continued)

(56) References Cited

U.S. PATENT DOCUMENTS 3,917,295 A    11/1975   Hiruma
4,693,494 A     9/1987   Buma et al.
(Continued)

FOREIGN PATENT DOCUMENTS

CN        1169923 A    1/1998
JP       60185610 A    9/1985
(Continued)

*Primary Examiner* — Ryan Zeender
*Assistant Examiner* — Dana Amsdell
(74) *Attorney, Agent, or Firm* — The Webb Law Firm

(57) ABSTRACT

A suspension system for a traveling vehicle body is disclosed. The system includes a suspension reference position varying mechanism (18) for varying a reference position of a suspension stroke of the suspension mechanism (100), and a controller (35) configured to calculate an intermediate value from a maximal value corresponding to the maximal position of the suspension stroke and a minimal value corresponding to the minimal position of the suspension stroke, and to control the suspension reference position varying mechanism such that, when the calculated intermediate values deviates from a set target range, the intermediate value is displaced toward the target range. The controller (35) increases a control execution frequency for the suspension reference position varying mechanism (18) when the traveling speed of the vehicle body is low, and reduces the control execution frequency for the suspension reference position varying mechanism (18) when the traveling speed of the vehicle body is high.

4 Claims, 6 Drawing Sheets

(51) Int. Cl.
*B60G 9/02* (2006.01)
*B60G 17/052* (2006.01)
*B60G 17/019* (2006.01)
*B60G 17/04* (2006.01)
*B60G 17/0165* (2006.01)
*B60G 17/018* (2006.01)
*B60G 17/016* (2006.01)

(52) U.S. Cl.
CPC ......... *B60G 17/04* (2013.01); *B60G 17/0523* (2013.01); *B60G 2200/32* (2013.01); *B60G 2300/082* (2013.01); *B60G 2400/252* (2013.01)

(58) Field of Classification Search
CPC  B60G 17/018; B60G 17/08; B60G 2400/102; B60G 2400/91; B60G 2600/17; B60G 2600/182; B60G 2600/1877
See application file for complete search history.

(56) References Cited

U.S. PATENT DOCUMENTS

| | | | | |
|---|---|---|---|---|
| 4,743,000 | A * | 5/1988 | Karnopp | B60G 17/0152 188/266.5 |
| 4,747,615 | A | 5/1988 | Yamamoto | |
| 4,756,549 | A * | 7/1988 | Kurosawa | B60G 17/0165 180/41 |
| 4,789,935 | A * | 12/1988 | Buma | B60G 17/0165 280/5.507 |
| 4,803,630 | A | 2/1989 | Takizawa et al. | |
| 4,948,164 | A * | 8/1990 | Hano | B60G 17/0163 280/124.106 |
| 4,954,957 | A * | 9/1990 | Kawagoe | B60G 17/0162 180/422 |
| 5,041,977 | A * | 8/1991 | Kawabata | B60G 17/0185 280/5.501 |
| 5,085,459 | A * | 2/1992 | Sato | B60G 17/018 280/5.5 |
| 5,122,955 | A * | 6/1992 | Ishikawa | B62D 15/02 180/415 |
| 5,144,558 | A | 9/1992 | Fukushima et al. | |
| 5,467,280 | A | 11/1995 | Kimura | |
| 5,684,698 | A * | 11/1997 | Fujii | B60G 17/018 180/41 |
| 5,893,041 | A | 4/1999 | Shibata et al. | |
| 6,145,859 | A | 11/2000 | Altherr et al. | |
| 6,752,403 | B2 * | 6/2004 | Allen | B60G 17/005 180/89.12 |
| 7,668,645 | B2 | 2/2010 | Lu et al. | |
| 7,715,963 | B2 | 5/2010 | Yasui et al. | |
| 8,296,009 | B2 | 10/2012 | Kajino | |
| 9,020,698 | B2 * | 4/2015 | Iwami | B60G 9/022 280/5.5 |
| 2002/0116104 | A1 | 8/2002 | Kawashima et al. | |
| 2009/0020975 | A1 | 1/2009 | Iwami et al. | |
| 2009/0212473 | A1 | 8/2009 | Matsuzaki et al. | |
| 2010/0138108 | A1 | 6/2010 | Kajino | |

FOREIGN PATENT DOCUMENTS

| | | | |
|---|---|---|---|
| JP | 61030408 | 2/1986 | |
| JP | 62283009 A | 12/1987 | |
| JP | 328010 A | 2/1991 | |
| JP | 03032912 | 2/1991 | |
| JP | 03281962 | 12/1991 | |
| JP | 0781542 A | 3/1995 | |
| JP | 10016528 | 1/1998 | |
| JP | 200923547 | 2/2009 | |
| JP | 5457641 B2 * | 4/2014 | ............. B60G 9/022 |

* cited by examiner

SUSPENSION SYSTEM

This application is a divisional application of U.S. patent application Ser. No. 12/674,963, filed Feb. 24, 2010, entitled "Suspension System", which was the national stage of International Application No. PCT/JP2009/055983, filed Mar. 25, 2009, which claims the benefit of Japanese Patent Application No. 2008-106153 2008, all of which are hereby incorporated by reference in their entirety.

TECHNICAL FIELD

The present invention relates to a suspension system for a work vehicle such as a tractor.

BACKGROUND ART

A tractor is an example of work vehicle. Some tractors include a suspension mechanism at front wheels as disclosed in Patent Document 1, for example. In general, a suspension mechanism provides an operator with a riding comfort by absorbing unevenness of the ground surface in association with upward/downward movement thereof according to the ground surface unevenness.

A work site where the work vehicle travels has more unevenness than a paved road and the work vehicle is often equipped with an implement. Therefore, a suspension stroke position of the suspension mechanism sometimes deviates from a preset target range (when the suspension stroke position of the suspension mechanism is located within the target range, the vehicle height is maintained within a predetermined height range) either to the vehicle body elevating side or vehicle body lowering side, whereby the vehicle height may deviate (change extraordinarily) from a predetermined height range.

In this case, it is desired for the work vehicle to restrict such an extraordinary change in vehicle height, thereby to constantly maintain the vehicle height within the predetermined height range. Hence, the art has proposed to maintain the vehicle height within the predetermined height range as much as possible, by means of a suspension reference position varying mechanism configured to move the suspension stroke position of the suspension mechanism toward the target range when the suspension stroke position of the suspension mechanism deviates from the target range either to the vehicle elevating side or vehicle lowering side as described above.

Patent Document 1: United States Patent No. 6145859

With the suspension system for a work vehicle described above, when the suspension mechanism is provided with the above-described suspension reference position varying mechanism for varying the reference position of the suspension stroke of this suspension mechanism, there occurs a problem as described next. That is, when the suspension mechanism is operative and if the suspension reference position varying mechanism is activated in association with each and every occurrence of deviation of the suspension stroke position of the suspension mechanism from the target range to the vehicle elevating side or the vehicle lowering side, then, the operation frequency of the suspension reference position varying mechanism will be very high, which is disadvantageous from the viewpoint of the durability of this suspension reference position varying mechanism.

DISCLOSURE OF INVENTION

The object of the present invention is to provide a suspension system of a work vehicle with an advantageous situation concerning the durability by reducing an operational load of the suspension reference position varying mechanism.

The above-noted object is fulfilled, according to one aspect of the present invention as under:

A suspension system comprising:
a suspension mechanism for a traveling vehicle body;
a suspension reference position varying mechanism configured to vary a reference position of a suspension stoke of the suspension mechanism;
a controller configured to calculate an intermediate value from a maximal value corresponding to a maximal position of the suspension mechanism and a minimal value corresponding to a minimal position of the suspension mechanism, and to displace the calculated intermediate value toward a target range when the intermediate value has deviated from the target range; and
said controller being configured to increase its control execution frequency for controlling the suspension reference position varying mechanism when a traveling speed of the vehicle body is a low speed, and to decrease its control execution frequency when the traveling speed of the vehicle body is a high speed.

With this construction, even when the suspension stroke position of the suspension mechanism has deviated from the target range to the vehicle body elevating side or the vehicle body lowering side, this does not directly result in immediate activation of the suspension position varying mechanism.

When the suspension stroke position of the suspension mechanism deviates from the target range to the vehicle body elevating side or the vehicle body lowering side, this suspension stroke position will normally change to the vehicle body lowering side subsequent to the change to the vehicle body elevating side, or change to the vehicle body elevating side subsequent to the change to the vehicle body lowering side, so that there will occur repetition of oscillating changes in suspension stroke position, i.e. reciprocation between the maximal and minimal positions of the suspension stroke position. According to the present invention, these maximal and minimal positions of the suspension stroke position are detected and comparison is made between an intermediate position calculated from these maximal and minimal positions and a target range.

The suspension reference position varying mechanism is controlled by the controller such that, when the calculated intermediate value has deviated from the set target range, this intermediate value is changed toward the target range. What is important here is that the suspension reference position varying mechanism will remain un-activated as long as the intermediate value is kept within the target range, even if the suspension stroke position of the suspension mechanism has deviated to the vehicle body elevating side or the vehicle body lowering side. Even if the suspension stroke position of the suspension mechanism has deviated from the target range either to the vehicle body elevating side or the vehicle body lowering side, as long as the intermediate position calculated from the suspension stroke positions remains within the target range, it may be determined that the vehicle height remains within a predetermined height range during a set period. So, it is determined that there is no need to activate the suspension reference position varying mechanism. With this, it is possible to eliminate the inconvenience of the suspension reference position varying mechanism being always activated in response to each and every occurrence of change in suspension stroke position of the suspension mechanism from the target range to the vehicle body elevating side or the vehicle body lowering side, so that the operational frequency of the suspension reference position varying mechanism can be reduced advantageously.

With a tractor as an example of work vehicle, in some cases, a front loader (an example of implement) is connected to the front of the vehicle body, for example, in order to use it to effect a scooping (loading)/unloading operation of sand or earth, or a loading/unloading operation of a load.

In such a case, when a scooping (loading)/unloading operation of sand or earth, or a loading/unloading operation of a load with the front loader is effected, this causes significant change in weight applied to the vehicle body, so that the posture of the vehicle body will change (the suspension stroke position will change to the vehicle body elevating side or the vehicle body lowering side). For example, when a scooping (charging) operation of sand/earth is effected, this increases the weight applied to the vehicle body, so the suspension stroke position will change to the vehicle body lowering side. Whereas, when a discharging/unloading operation of sand/earth with the front loader is effected, this decreases the weight applied to the vehicle body, so the suspension stroke position will change to the vehicle body elevating side. In general, such a scooping (loading)/unloading operation of sand or earth or a loading/unloading operation of a load with the front loader is effected when the traveling speed of the vehicle body is low or the vehicle body is stopped.

According to one characterizing feature of the present invention, when the traveling speed of the vehicle body is low (or the vehicle body is stopped), the control execution frequency of the suspension reference position varying mechanism is increased. This means increase of the control sensitivity for the suspension reference position varying mechanism. With this, when a front loader is connected to the front of the vehicle body for effecting a scooping (loading)/unloading operation of sand or earth, or a loading/unloading operation of a load with this front loader, even if this causes significant change in weight applied to the vehicle body and thus change in the posture of the vehicle body (change of the suspension stroke position to the vehicle body elevating side or the vehicle body lowering side), the suspension reference position mechanism will be operated soon so as to maintain the calculated intermediate value within the target range, thus restricting change in posture of the vehicle body.

According to a further characterizing feature of the present invention, when the traveling speed of the vehicle body is high, the control execution frequency of the suspension reference position varying mechanism is decreased. This means decrease of the control sensitivity for the suspension reference position varying mechanism. When the traveling speed of the vehicle body is high, even if a front loader is connected to the front of the vehicle body, there is only low possibility of effecting a scooping (loading)/unloading operation of sand or earth, or a loading/unloading operation of a load with this front loader. So, the decrease in control execution frequency for the suspension reference position varying mechanism will not cause any inconvenience.

With the suspension system according to the present invention, the control execution frequency of the suspension reference position varying mechanism can be reduced, thus being advantageous for the durability of the suspension reference position varying mechanism. And, when an implement such as a front loader is connected to the vehicle body, most likely, a scooping (loading)/unloading operation of sand or earth, or a loading/unloading operation of a load with this front loader will be effected while the traveling speed of the vehicle body is a low speed (or while the vehicle body is stopped) and such operation will not be effected while the traveling speed of the vehicle body is a high speed. Then, the suspension system according to the present invention can appropriately cope with such mode of work.

The above-noted object is fulfilled also, according to a further aspect of the present invention as under:

A suspension system comprising:

a suspension mechanism for a traveling vehicle body;

a suspension reference position varying mechanism configured to vary a reference position of a suspension stoke of the suspension mechanism;

a controller configured to calculate an intermediate value from a maximal value corresponding to a maximal position of the suspension mechanism and a minimal value corresponding to a minimal position of the suspension mechanism, and to displace the calculated intermediate value toward a target range if a number of times of abnormality has exceeded a decision number of times, said number of times of abnormality being calculated based upon a number of times that said calculated intermediate value has deviated from the target range, and said controller being configured to decrease the decision number of times when a traveling speed of the vehicle body is a low speed and to increase the decision number of times when the traveling speed of the vehicle body is a high speed.

With this construction too, like the suspension system described hereinbefore, even when the suspension stroke position of the suspension mechanism has deviated from the target range to the vehicle body elevating side or the vehicle body lowering side, this does not result in immediate activation of the suspension position varying mechanism. The reason will be described next.

With this suspension system, an intermediate value calculated from a maximal value corresponding to the maximal position of the suspension mechanism and a minimal value corresponding to the minimal position of the suspension mechanism is compared with a target range. And, the number of abnormality is calculated based on the number of times that the calculated intermediate value has deviated from the target range. Normally, the number of times of deviation may be the same as the number of times of abnormality. And, only when the number of times of abnormality exceeds the decision number of times, the suspension reference position varying mechanism will be activated so as to displace the intermediate value toward the target range. Therefore, even if the suspension stroke position of the suspension mechanism deviates from the target range to the vehicle body elevating side or the vehicle body lowering side, as long as the number of times of abnormality does not exceed the decision number of times, the suspension reference position varying mechanism will not be activated. Even if the suspension stroke position of the suspension mechanism has deviated form the target range to the vehicle body elevating side or the vehicle body lowering side, unless the number of times of abnormality of the calculated deviating from the target range exceeds the decision number of times, it will be determined that the vehicle height remains within a predetermined height range during the set period, so that the suspension reference position varying mechanism will not be activated.

According to one characterizing feature of this construction, in case the traveling speed of the vehicle body is a low speed (or the vehicle body is stopped), the decision number of times is decreased, thereby to increase the operation frequency of the suspension reference position varying mechanism. According to a further characterizing feature of this construction, in case the traveling speed of the vehicle body is a high speed, the decision number of times is increased, thereby to decrease the operation frequency of the suspension reference position varying mechanism. With this, like the suspension system described hereinbefore, the control execution frequency for the suspension reference position varying mechanism can be lowered, thus providing advantage in terms of the durability of the suspension reference position varying mechanism. Further, the above-described mode of work of the front loader or the like can be coped with appropriately.

According to one specific preferred example of the suspension system of the present invention:

said suspension mechanism includes a hydraulic cylinder which acts as a functional member for creating said suspension stroke by connecting an accumulator to an oil chamber of this hydraulic cylinder;

a control valve capable of feeding/discharging work oil of a pump is connected to an oil passage connecting between the oil chamber of the hydraulic cylinder and the accumulator; and as said control valve controls the pressure of the oil chamber of the hydraulic cylinder, the reference position of the suspension stroke of the suspension mechanism is changed to a vehicle body elevating side or a vehicle body lowering side.

With the above, in response to change in load applied to the hydraulic cylinder, work oil flows from the oil chamber of the hydraulic cylinder into the accumulator. And, in response to introduction of the work oil from the accumulator into the oil chamber of the hydraulic cylinder, the hydraulic cylinder effects expansion or contraction to act as the suspension mechanism. In the hydraulic cylinder described above, the suspension reference position varying mechanism is configured such that, by effecting the pressure control of the oil chamber of this hydraulic cylinder by a control valve, the operation of the suspension mechanism is changed to the vehicle body elevating side or the vehicle body lowering side.

Since the control valve capable of feeding/discharging work oil of a pump is connected to an oil passage connecting between the oil chamber of the hydraulic cylinder and the accumulator, the oil passage connecting between the oil chamber of the hydraulic cylinder and the accumulator can be used also as an oil passage for feeding/discharging the work oil of the pump to/from the hydraulic cylinder. As a result, compared with a construction wherein an oil passage interconnecting between the oil chamber of the hydraulic cylinder and the accumulator and an oil passage for feeding/discharging the work oil of the pump to/from the hydraulic cylinder are provided separately of each other, the number of oil passages can be reduced.

As the suspension mechanism is comprised of a hydraulic cylinder and there are provided an accumulator for expanding/contracting the hydraulic cylinder as a suspension mechanism and a control valve for changing the operation of the suspension mechanism to the vehicle body elevating side or the vehicle body lowering side, the number of oil passages can be reduced, thus providing advantage in terms of simplicity of the construction.

BEST MODE FOR CARRYING OUT THE INVENTION

Figure 1:
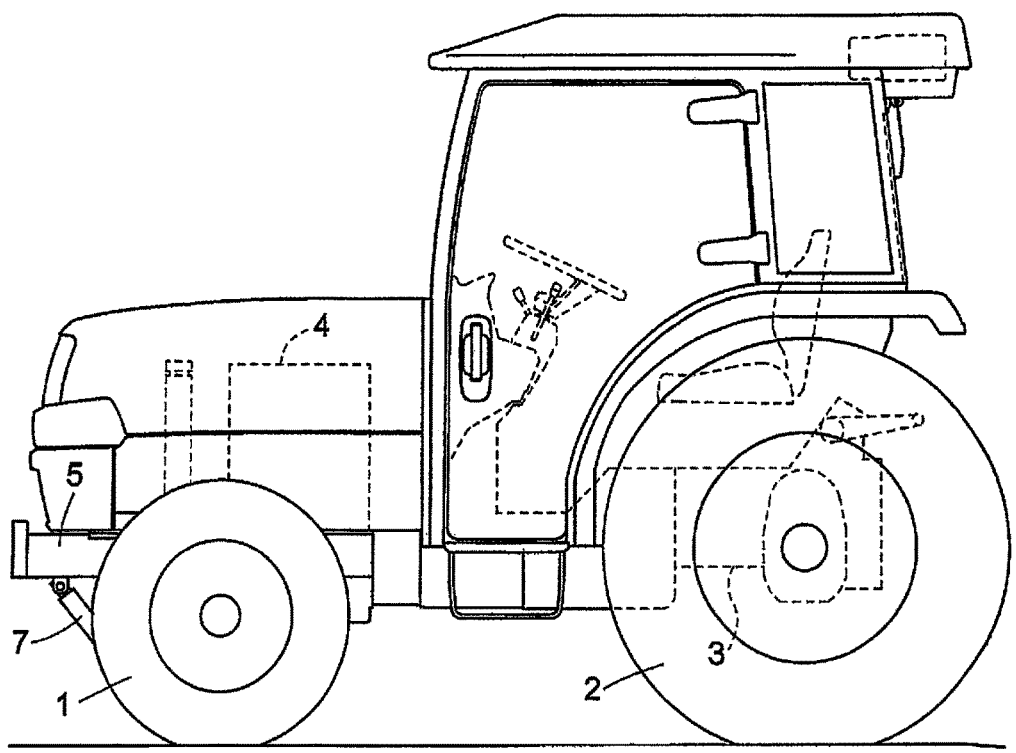
FIG. 1 is an overall side view of an agricultural tractor.
Figure 2:
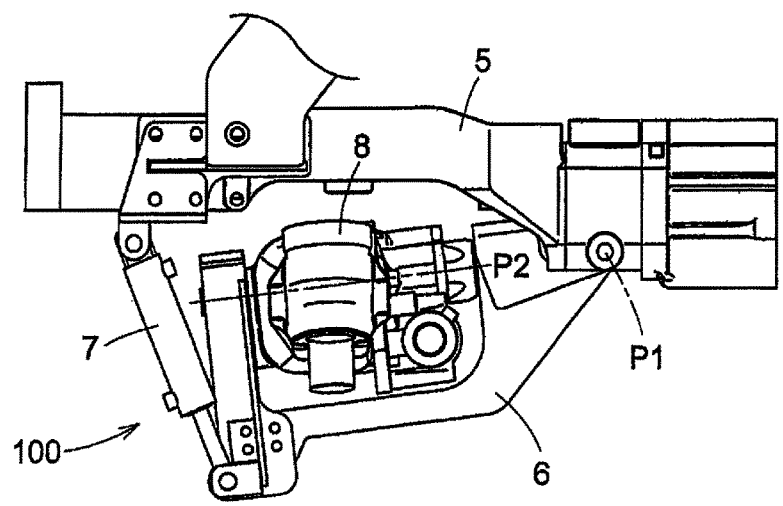
FIG. 2 is a side view showing a region in the vicinity of a front axle case, a support bracket and a hydraulic cylinder.
Figure 3:
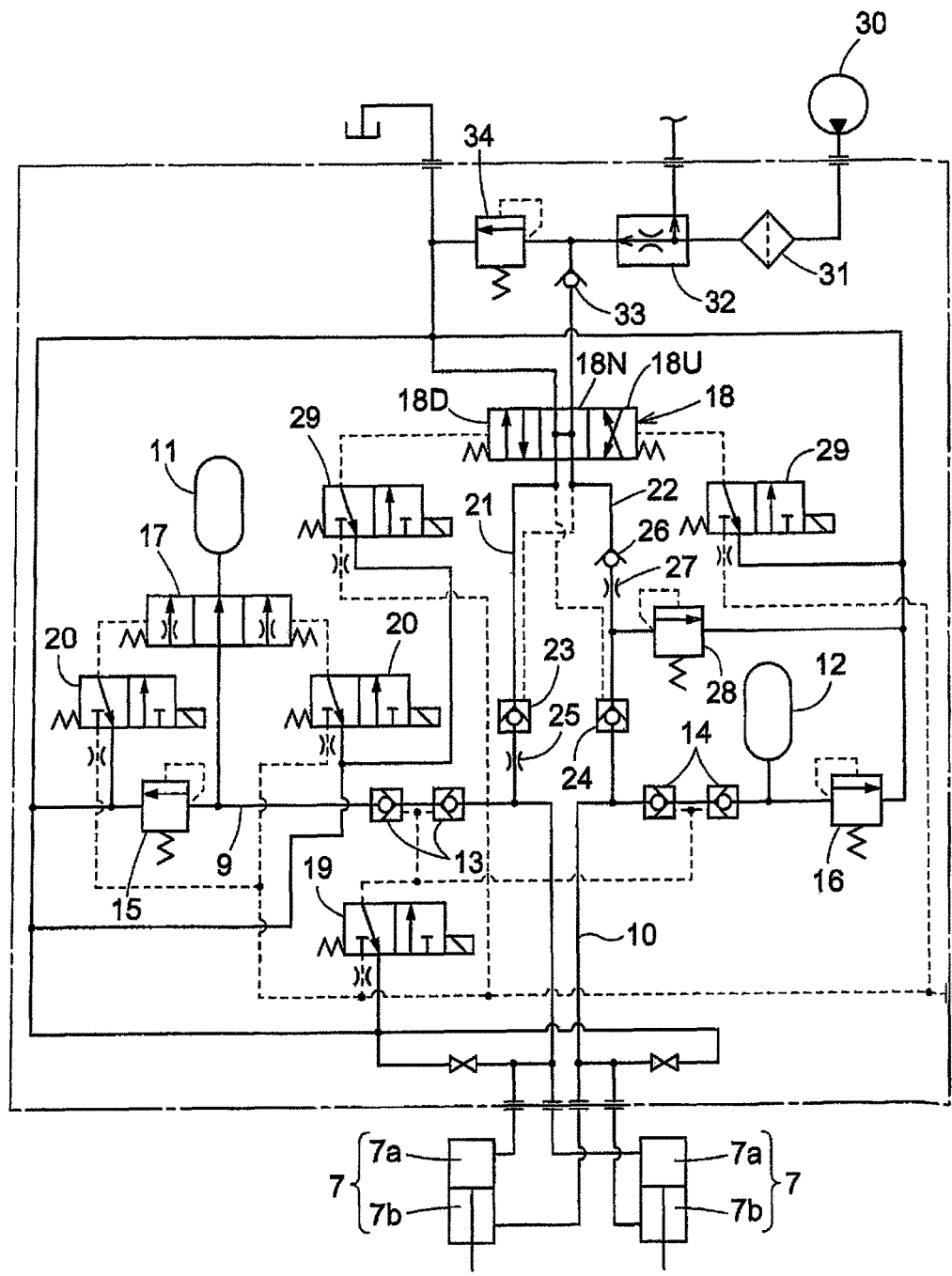
FIG. 3 is a view showing a hydraulic circuit construction of the hydraulic cylinder.
Figure 4:
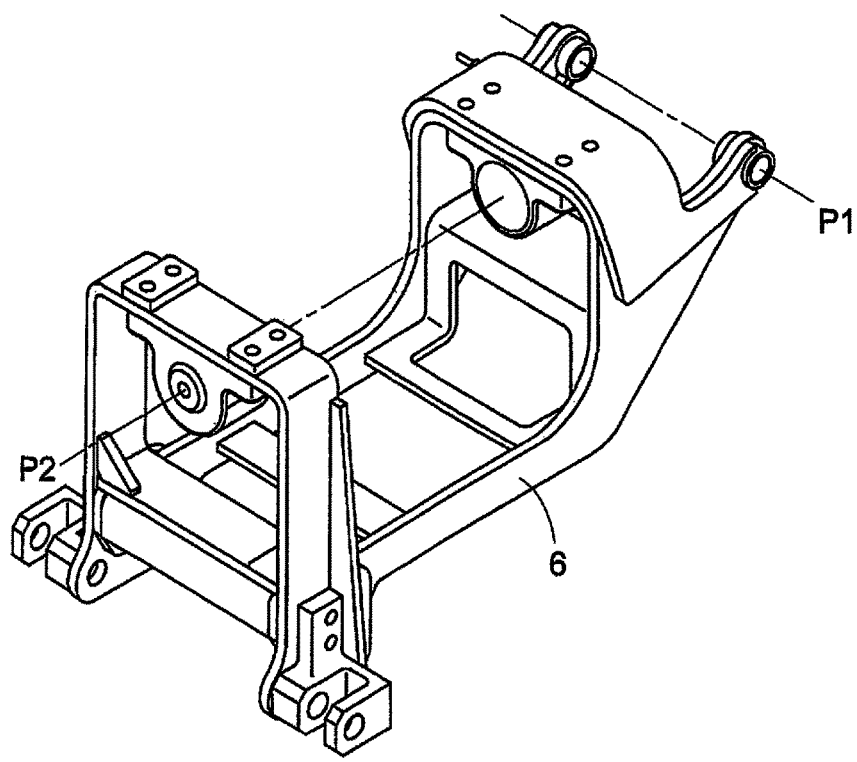
FIG. 4 is a perspective view of the support bracket.
Figure 5:
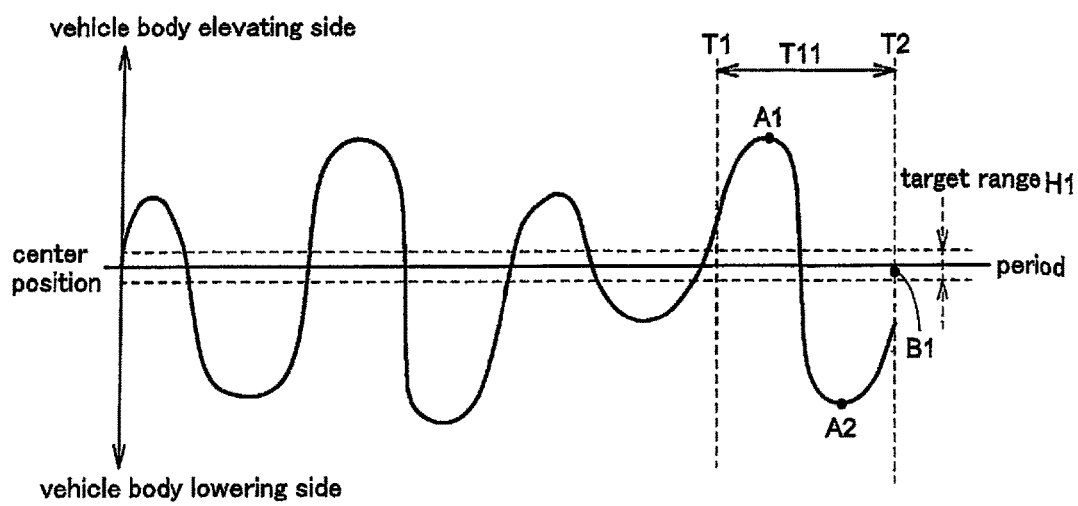
FIG. 5 is a view showing conditions of suspension stroke positions (expanded/contracted positions) of the hydraulic cylinder.

With reference to the accompanying figures, there will be described a tractor hereinafter, as an example of a work vehicle mounting a suspension system according to the present invention. FIG. 1 is an overall side view of an agricultural tractor. FIG. 2 is a side view showing a region in the vicinity of a front axle case, a support bracket and a hydraulic cylinder. FIG. 3 is a view showing a hydraulic circuit construction of the hydraulic cylinder. FIG. 4 is a perspective view of the support bracket, FIG. 5 is a view showing conditions of suspension stroke positions (expanded/contracted positions) of the hydraulic cylinder. As shown in FIG. 1, the tractor includes right and left front wheels 1 and right and left rear wheels 2. The right and left rear wheels 2 are supported, via a suspension mechanism, to a transmission case 3 mounted at a rear portion of the vehicle body and supported under a position-fixed condition.

As shown in FIGS. 1, 2 and 4, downwardly of an engine 4 mounted at a front portion of the vehicle body, a support frame 5 is connected and projects forwardly. A support bracket 6 having a U-shape in its side view is supported to be vertically pivotable about a right/left axis P1 provided at a rear portion of the support frame 5. And, between the front portion of the support frame 5 and the front portion of the support bracket 6, two hydraulic cylinders 7 (included in the suspension mechanism) are connected. A front axle case 8 is supported to be capable of a rolling action about a fore/aft axis P2 of the support bracket 6, and the right/left front wheels 1 are supported to the right/left sides of the front axle case 8.

Next, a hydraulic circuit construction of the hydraulic cylinder 7 will be explained.

As shown in FIG. 3, the hydraulic cylinder 7 is constructed as a double-acting type including an oil chamber 7a on the bottom side and a further oil chamber 7b on the piston side. To an oil passage 9 connected to the oil chamber 7a of the hydraulic cylinder 7, there are connected a gas-charged type accumulator 11, a pair of pilot-operation type check valves 13, and a relief valve 15 for protecting the hydraulic circuit. Before the accumulator 11, there is provided a pilot-operation type switch valve 17 having three kinds of orifices having "large", "medium" and "small" bore diameters and there is provided a pilot valve 20 for operating the switch valve 17. To an oil passage 10 connected to the oil chamber 7b of the hydraulic cylinder 7, there are connected a gas-charged type accumulator 12, a pair of pilot-operation type check valves 14, and a relief valve 16 for protecting the hydraulic circuit.

As shown in FIG. 3, there is provided a pilot valve 19 for feeding/discharging pilot work oil to/from the check valves 13, 14. By this pilot valve 19, the check valves 13, 14 are operated into a shut state (a state shutting off the connection between the accumulators 11, 12 and the oil chambers 7a, 7b of the hydraulic cylinder 7) and an opened state (a state allowing flow of the work oil from the accumulators 11, 12 to the oil chambers 7a, 7b of the hydraulic cylinder 7 as well as from the oil chambers 7a, 7b of the hydraulic cylinder 7 to the accumulators 11, 12).

As shown in FIG. 3, work oil from a pump 30 is fed to a control valve 18 (corresponding to the "suspension reference position varying mechanism") via a filter 31, a flow dividing valve 32 and a check valve 33, and a relief valve 34 is connected between the flow dividing valve 32 and the check valve 33. An oil passage 21 extends from the control valve 18 to a portion of the oil passage 9 between the oil chamber 7a of the hydraulic cylinder 7 and the check valves 13; and an oil passage 22 extends from the control valve 18 to a portion of the oil passage 10 between the oil chamber 7b of the hydraulic cylinder 7 and the check valves 14.

As shown in FIG. 3, the control valve 18 comprises a three-position valve which is switchable among three (3) positions including: an elevating position 18U for feeding the work oil to the oil passage 21 (the oil chamber 7a of the hydraulic cylinder 7); a lowering position 18D for feeding the work oil to the oil passage 22 (the oil chamber 7b of the hydraulic cylinder 7); and a neutral position 18N. Also, the control valve 18 comprises a pilot-operation type valve including a pilot valve 29 for operating this control valve 18.

As shown in FIG. 3, the oil passage 21 incorporates a pilot-operation type check valve 23 and a throttle portion 25. The oil passage 22 incorporates a pilot operation type check valve 24, a check valve 26 (the check valve 24 is provided on the oil passage 10 side and the check valve 26 is provided on the control valve 18 side) and a throttle portion 27. And, between the check valve 24 and the check valve 26 (throttle portion 27), a relief valve 28 is connected.

Each of the pilot valves 19, 20, 29 is of an electromagnetic operation type, so that the pilot valve 19 and the pilot valves 20, 28 are operated by a controller 35 to be described later, whereby the check valves 13, 14, the control valve 18 and the switch valve 17 are operated.

Next, operations of the hydraulic cylinder 7 will be explained.

As shown in FIG. 3, when the control valve 18 is operated to the neutral position 18N and the check valves 13, 14 are operated to the opened state, if the front axle case 8 and the support bracket 6 are to be vertically pivoted about the right/left axis P1 according to unevenness of the ground surface, the hydraulic cylinder 7 will be expanded/contracted, whereby the work oil is moved back and forth between the oil chambers 7a, 7b of the hydraulic cylinder 7 and the accumulators 11, 12, so that the hydraulic cylinder 7 functions as a suspension mechanism having a spring constant K1.

In the above case, the pressures of the oil chamber 7b of the hydraulic cylinder 7 and the oil passage 10 are set in advance to a set pressure PM1 by the relief valve 28. Suppose the pressure of the oil chamber 7a of the hydraulic cylinder 7 is PH, the pressure receiving area of the piston of the oil chamber 7a of the hydraulic cylinder 7 is AH, the pressure receiving area of the piston of the oil chamber 7b of the hydraulic cylinder 7 is AR (AR is smaller than AH by an area corresponding to the piston rod), and the weight applied to the front portion of the vehicle body (weight applied to the hydraulic cylinder 7) is M and the acceleration of gravity is 'g'. Then, the following equation (1) is established.

$$M \times g = PH \times AH - MP1 \times AR \qquad \text{Equation (1)}$$

With the above, as the pressure MP1 of the oil chamber 7b of the hydraulic cylinder 7, the pressure receiving area AH of the piston of the oil chamber 7a of the hydraulic cylinder 7 and the pressure receiving area AR of the oil chamber 7b of the hydraulic cylinder 7 are constant, the pressure PH of the oil chamber 7a of the hydraulic cylinder 7 is higher than the pressure MP1 of the oil chamber 7b of the hydraulic cylinder 7, and varies according to the weight M applied to the front portion of the vehicle body (weight applied to the hydraulic cylinder 7).

The spring constant K1 of the hydraulic cylinder 7 is determined by the pressures PH, MP1 of the oil chambers 7a, 7b of the hydraulic cylinder 7. The greater the pressure PH of the oil chamber 7a of the hydraulic cylinder 7, the greater the constant K1. The smaller the pressure PH of the oil chamber 7a of the hydraulic cylinder 7, the smaller the constant K1. Therefore, the spring constant K1 of the hydraulic cylinder 7 is to be determined by the weight applied to the front portion of the vehicle body (weight applied to the hydraulic cylinder 7) M. The greater the weight applied to the front portion of the vehicle body (weight applied to the hydraulic cylinder 7) M, the greater the constant K1. The smaller the weight applied to the front portion of the vehicle body (weight applied to the hydraulic cylinder 7) M, the smaller the constant K1.

As shown in FIG. 3, when the control valve 18 is operated to the elevating position 18U and the check valves 13, 14 are operated to the shut states, then, the work oil is fed from the control valve 18 to the oil chamber 7a of the hydraulic cylinder 7, and the work oil is discharged from the oil chamber 7b of the hydraulic cylinder 7 through the check valve 24 (which has been operated to the open state by the pilot work oil of the control valve 18) and through the relief valve 28. In this case, pressures of the oil chamber 7b in the hydraulic cylinder 7 and the oil passage 10 are maintained at the set pressure MP1 by the relief valve 28.

With the above, the hydraulic cylinder 7 is expanded to elevate the front portion of the vehicle body (this corresponds to a state where the operation of the hydraulic cylinder 7 (suspension mechanism) has been changed to the vehicle body elevating side). Thereafter, if the control valve 18 is operated to the neutral position 18N and the check valves 13, 14 are operated to the opened states, the hydraulic cylinder 7 as being expanded, functions as the suspension mechanism as described hereinbefore.

As shown in FIG. 3, if the control valve 18 is operated to the lowering position 18D and the check valves 13, 14 are operated to the shut states, the work oil is fed from the control valve 18 to the oil chamber 7b of the hydraulic cylinder 7 and the work oil is discharged from the oil chamber 7a of the hydraulic cylinder 7 through the check valve 23 (which has been operated to the opened state by the pilot pressure of the control valve 18), the throttle portion 25 and the control valve 18. In this case, pressures in the oil chamber 7b of the hydraulic cylinder 7 and the oil passage 10 are maintained at the set pressure MP1 by the relief valve 28.

With the above, the hydraulic cylinder 7 is contracted to lower the front portion of the vehicle body. Thereafter, if the control valve 18 is operated to the neutral position 18N and the check valves 13, 14 are operated to the opened states, the hydraulic cylinder 7 as being contracted, functions as the suspension mechanism as described hereinbefore.

Figure 6:
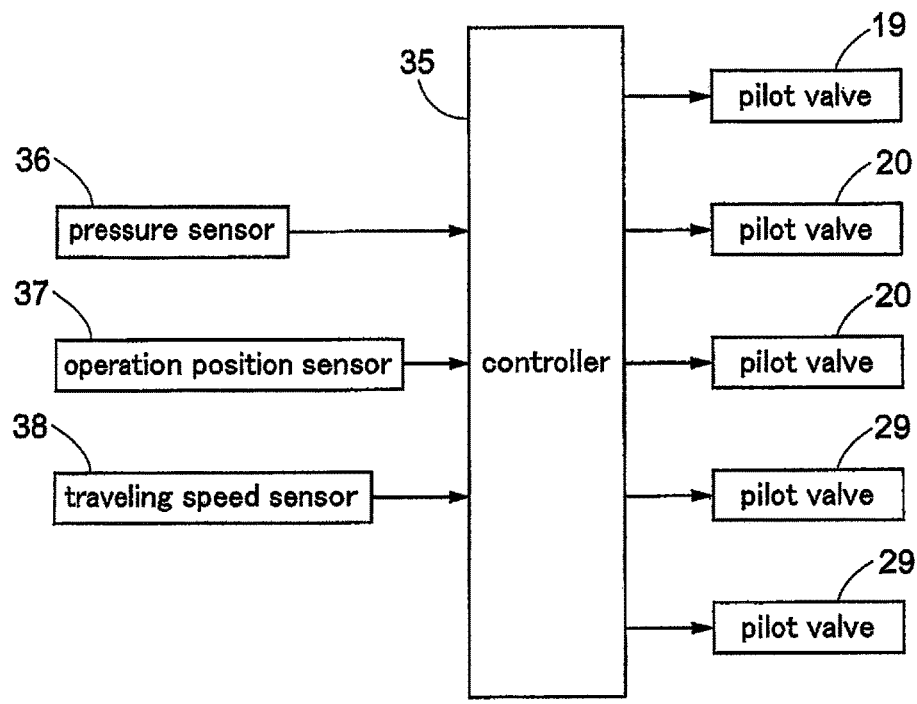
FIG. 6 is a block diagram showing relationship between a controller and pilot valves.

As shown in FIG. 3 and FIG. 6, there is provided a pressure sensor 36 for detecting pressure of the oil chamber 7a of the hydraulic cylinder 7. And, a detection value of this pressure sensor 36 is inputted to the controller 35. Based on the detection value of the pressure sensor 36, the weight applied to the front portion of the vehicle body (weight applied to the hydraulic cylinder 7) M is calculated.

With the above, when the weight applied to the front portion of the vehicle body (weight applied to the hydraulic cylinder 7) M is increased due to an implement mounted to the front portion of the vehicle body (e.g. the situation where a sand/earth scooping (charging) operation by the front loader is effected or a charging operation of a load is effected), the spring constant K1 of the hydraulic cylinder 7 becomes greater. In association with this, the check valve 17 is operated to the constricted side (the side of the orifice of the "small" bore diameter), so that the damping force of the hydraulic cylinder 7 becomes greater.

On the other hand, when the weight applied to the front portion of the vehicle body (weight applied to the hydraulic cylinder 7) M is decreased due to an implement mounted to the front portion of the vehicle body (e.g. the situation where a sand/earth discharging operation by the front loader is effected or a discharging operation of a load is effected), the spring constant K1 of the hydraulic cylinder 7 becomes smaller. In association with this, the check valve 17 is operated to the opened side (the side of the orifice of the "large" bore diameter), so that the damping force of the hydraulic cylinder 7 becomes smaller.

As may be understood from the graph of FIG. 5, the maximal value A1 is a value corresponding to the point where the suspension stroke position of the hydraulic cylinder 7 has been displaced toward the vehicle body elevating side and then displaced toward the vehicle body lowering side (the point where the hydraulic cylinder 7 is switched over from the expanding operation to the contracting operation). The minimal value A2 is a value corresponding to the point where the suspension stroke position of the hydraulic cylinder 7 has been displaced toward the vehicle body lowering side and then displaced toward the vehicle body elevating side (the point where the hydraulic cylinder 7 is switched over from the contracting operation to the expanding operation).

In this case, values corresponding to the suspension stroke positions (expanded/contracted positions) of the hydraulic cylinder 7 from the elapsed timing of the preceding cycle T12 to the elapsed timing of the present control cycle T12 (see the timing T2 in FIG. 5) will be stored as new values corresponding to new suspension stroke positions (expanded/contracted positions) of the hydraulic cylinder 7. Whereas, the values corresponding to the suspension stroke positions (expanded/contracted positions) of the hydraulic cylinder 7 prior to a timing T1 more previous by a set period T11 from the timing T2 will be deleted. Thus, with each lapse of the control cycle T12, a portion of the set of values stored in the controller corresponding to the suspension stroke positions (expanded/contracted positions) of the hydraulic cylinder 7 will be updated.

As shown in FIG. 6, there is provided a suspension stroke position sensor 37 for detecting the suspension stroke position (expanded/contracted position) of the hydraulic cylinder 7. And, the detection value of this suspension stroke position sensor 37 is inputted to the controller 35, so that the controller 35 stores therein this detection value as a value corresponding to the suspension stroke position (expanded/contracted position) of the hydraulic cylinder 7. In this case, an expansion/contraction type suspension stroke position sensor 37 will be mounted directly to the hydraulic cylinder 7 to detect the suspension stroke position (expanded/contracted position) of the hydraulic cylinder 7 or a rotary type suspension stroke position sensor 37 will be mounted to the position of the right/left axis P1 shown in FIG. 2 to detect an angle of the support bracket 6 relative to the support frame 5, thereby to detect the suspension stroke position (expanded/contracted position) of the hydraulic cylinder 7 Further, there is provided a traveling speed sensor 38 (corresponding to the "traveling speed detecting means") for detecting a traveling speed V of the vehicle body, and the detection value of this traveling speed detecting sensor 38 is inputted to the controller 35.

As shown in FIG. 5, the center position of the operation of the hydraulic cylinder 7 is set in the controller 35. In operation, when the suspension stroke position (expanded/contracted position) of the hydraulic cylinder 7 is at the center position, the vehicle body assumes a substantially parallel (substantially horizontal) posture relative to the ground surface. Further, in the controller 35, there is also set a target range H1 having certain ranges on the vehicle body elevating side and the vehicle body lowering side relative to the center position.

Figure 7:
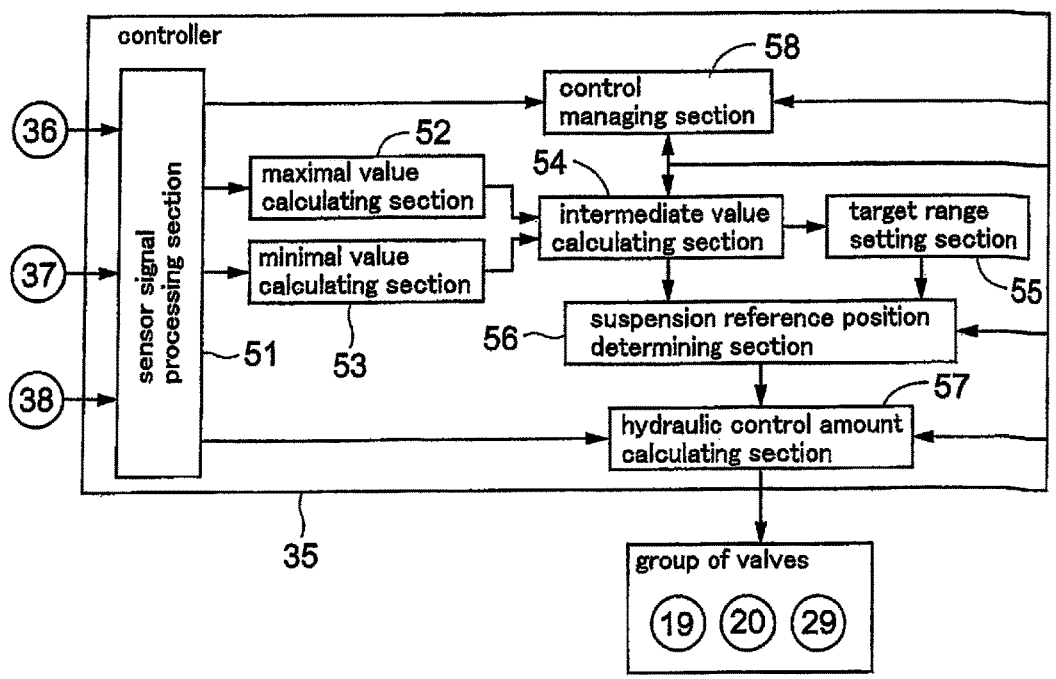
FIG. 7 is a functional block diagram showing functions of the controller.

FIG. 7 shows functional sections relating to the present invention which are to be constructed within the controller 35. Some examples of such functional sections include a sensor signal processing section 51, a maximal value calculating section 52, a minimal value calculating section 53, an intermediate value calculating section 54, a target range setting section 55, a suspension reference position determining section 56, a hydraulic control amount calculating section 57 and a control managing section 58 for managing these functional sections.

The sensor signal processing section 51 receives detection signals from the work position sensor (suspension stroke sensor) 37 and the traveling speed sensor 38, and converts them into data (values) to be processed inside the controller 35. The maximal value calculating section 52 calculates a maximal value corresponding to the maximal position of the suspension stroke, based on the data forwarded from the sensor signal processing section 51. The minimal value calculating section 53 calculates a minimal value corresponding to the minimal position of the suspension stroke, based on the data forwarded from the sensor signal processing section 51. The intermediate value calculating section 54 calculates an intermediate value from the maximal value and the minimal value corresponding to the minimal position. In general, this intermediate value is the average value of the maximal value and the minimal value, but can be obtained otherwise. For instance, this intermediate value can be an average value of a plurality of average values. Further, in general, such an average value will be calculated as an arithmetic average. Instead, this average value can be a weighted average value, depending on the suspension specification.

The target range setting section 55 sets a target range to be compared with the intermediate value. The suspension reference position setting section 56 determines a suspension reference position as a reference position for the suspension stroke (reference position of the suspension movement) of the suspension mechanism (hydraulic cylinder) 7, and based on this determined suspension reference position, the hydraulic control calculating section 57 determines a control amount for the suspension reference position varying mechanism 18 so as to realize this suspension reference position.

Figure 8:
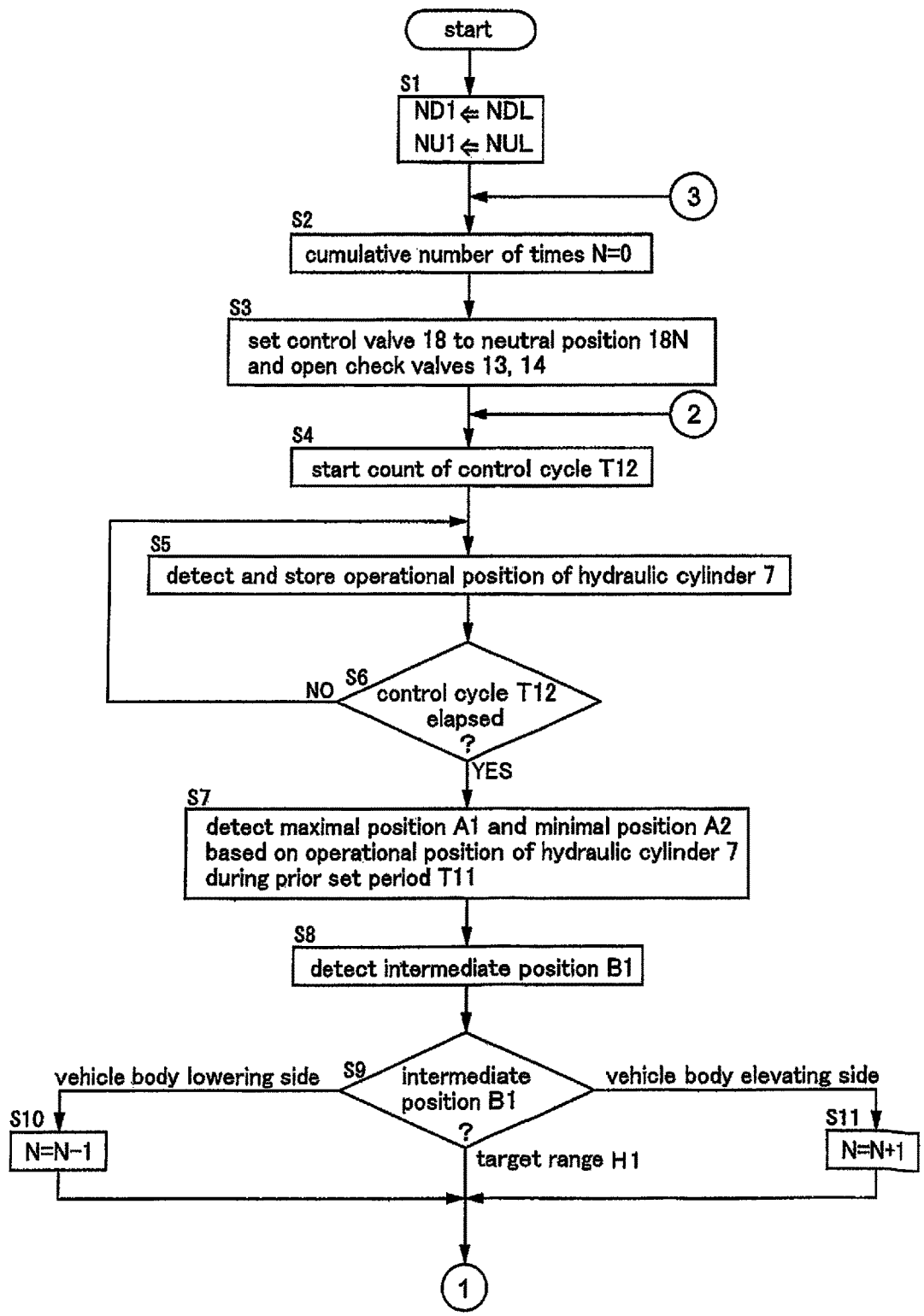
FIG. 8 is a view showing a former half of control flow of the hydraulic cylinder.
Figure 9:
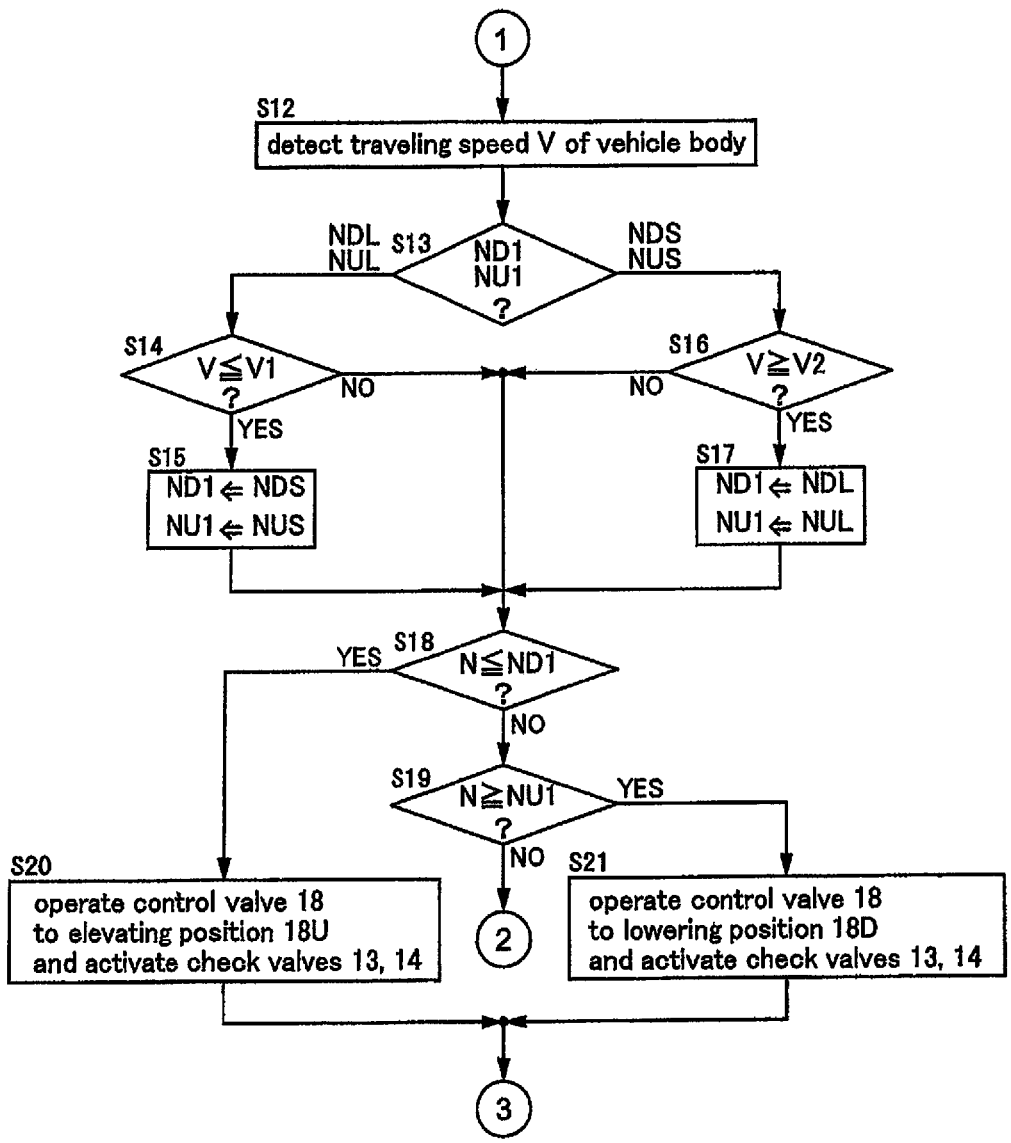
FIG. 9 is a view showing a latter half of the control flow of the hydraulic cylinder.

Next, there will be explained the flow of control for the suspension mechanism (hydraulic cylinder) 7, with reference to FIG. 8 and FIG. 9.

In the controller 35, there are set a first decision-reference value NDS and a second decision-reference value NDL, and a first decision-reference value NUS and a second decision-reference value NUL. First, the second decision-reference value NDL is set as a lowering side decision number of times ND1 and the second decision-reference value NUL is set as an elevating side decision number of times NU1 (step S1). In this case, the first decision-reference value NDS is set to a smaller value than the second decision-reference value NDL and the first decision-reference value NUS is set to a smaller value than the second decision-reference value NUL. A cumulative number of times N is also set in the controller 35.

First, the cumulative number of times N is set to '0' (step S2). When the control valve 18 is operated to the neutral position 18N and the check valves 13, 14 are operated to the opened states (the condition of the hydraulic cylinder 7 operating as a suspension mechanism) (step S3), the count of the control cycle T12 is started (step S4) and the suspension stroke position (expanded/contracted position) of the hydraulic cylinder 7 is detected and a value corresponding thereto is stored (step S5).

When the control cycle T12 has elapsed (step S6) (see the timing T2 in FIG. 5), the maximal value A1 corresponding to the maximal position and the minimal value A2 corresponding to the minimal position of the operation of the hydraulic cylinder 7 are detected among all of the values corresponding to the suspension stroke positions (expanded/contracted positions) of the hydraulic cylinder 7 during a prior set period T11 back from the timing T2 (see the prior period from the timing T2 back to the timing T1 in FIG. 5) (step S7). Then, an intermediate value B1 between the maximal value A1 and the minimal value A2 (an intermediate value between the maximal value A1 and minimal value A2) is detected (step S8).

At steps S6, S7, if the set period T11 is set slightly longer than one cycle of the resonance frequency of the hydraulic cylinder 7 (suspension mechanism), one maximal value A1 and one minimal value A2 will be detected during this set period T11. In this case, the intermediate value B1 is detected from the one maximal value A1 and the one minimal value A2 (step S8).

At steps S6, S7, if the set period T11 is set longer than above to a certain degree, then, a plurality of maximal values A1 and a plurality of minimal values A2 will be detected during this set period T11. In this case, the greatest maximal value A1 of the plurality of maximal values A1 and the smallest minimal value A2 of the plurality of minimal values A2 will be detected, respectively, and an intermediate value B1 is detected from the greatest maximal value A1 and the smallest minimal value A2 (step S8).

Upon detection of the intermediate value B1, this intermediate value B1 is compared with the target range H1 (step S9), and if it is determined that the intermediate value B1 deviates from the target range H1 toward the vehicle body lowering side, '1' is subtracted from the cumulative number of times N indicating an abnormality number of times (step S10). Whereas, if it is determined that the intermediate value B1 deviates from the target range H1 toward the vehicle body elevating side, '1' is added to the cumulative number of times N (step S11). If it is determined that the intermediate value B1 is within the target range, addition or subtraction to/from the cumulative number of times N is not effected.

Then, the process goes on to step S4 and steps S4 through S11 will be executed, in which the calculation of the intermediate value B1, the comparison between the intermediate value B1 and the target range H1, and the addition and subtraction to/from the cumulative number of times N will be effected. Thereafter, the process goes again to step S4, to execute the steps S4-S11 repeatedly.

After each cycle of the executions of the calculation of the intermediate value B1, the comparison between the intermediate value B1 and the target range H1, and the addition/subtraction to/from the cumulative number of times N (steps S4-S11), the traveling speed V of the vehicle body will be inputted (step S12). And, based on this traveling speed V of the vehicle body, the lowering side decision number of times ND1 (corresponding to the "decision number of times") and the elevating side decision number of times NU1 (corresponding to the "decision number of times") will be set as under.

When the second decision-reference value NDL is set as the lowering side decision number of times ND1 (corresponding to the condition of reducing the operational frequency) and the second decision-reference value NUL is set as the, elevating side decision number of times NU1 (corresponding to the condition of reducing the operational frequency) (step S13), and if the traveling speed V of the vehicle body becomes lower than a first set speed V1 (including the condition of the traveling speed V of the vehicle body being '0') (step S14), then, the first decision-reference value NDS is set as the lower side decision number of times ND1 (corresponding to the condition of increasing the operational frequency), and the first decision-reference value NUS is set as the elevating side decision number of times NU1 (corresponding to the condition of increasing the operational frequency) (step S15).

If the traveling speed V of the vehicle body is higher than the first set speed V1 (step S14), the second decision of times NDL is maintained as the lowering side decision number of times ND1 and the second decision-reference value NUL is maintained as the elevating side decision number of times NU1.

On the other hand, when the first decision-reference value NDS is set as the lowering side decision number of times ND1 (corresponding to the condition of increasing the operational frequency) and the first decision-reference value NUS is set as the elevating side decision number of times NU1 (corresponding to the condition of increasing the operational frequency) (step S13), and if the traveling speed V of the vehicle body becomes higher than a second set speed V2 (higher speed than the first set speed V1) (step S16), then, the second decision-reference value NDL is set as the lower side decision number of times ND1 (corresponding to the condition of reducing the operational frequency) and the second decision-reference value NUL is set as the elevating side decision number of times NU1 (corresponding to the condition of reducing the operational frequency) (step S17).

If the traveling speed V of the vehicle body is lower than the second set speed V2 (step S16), the first decision of times NDS is maintained as the lowering side decision number of times ND1 and the first decision-reference value NUS is maintained as the elevating side decision number of times NU1.

With the above-described setting of the lowering side decision number of times ND1 and the elevating side decision number of times NU1, comparison between the cumulative number of times N and the lowering side decision number of times ND1 and comparison between the cumulative number of times N and the elevating side decision number of times NU1 are effected, and if the cumulative number of times N reaches the lowering side decision number of times ND1 (becomes smaller than it) (step S18), then, it is determined that the front portion of the vehicle body is being lowered relative to the ground surface. Hence, the control valve 18 will be operated to the elevating position 18U and the check valves 13, 14 will be operated to the operative states (step S20).

With the above, with the pressures of the oil chamber 7*b* of the hydraulic cylinder 7 and the oil passage 10 being maintained at the set pressure MP1 by the relief valve 28, the hydraulic cylinder 7 is expanded to elevate the front portion of the vehicle body. When the hydraulic cylinder 7 has been expanded by the amount corresponding to the difference between the intermediate position B1 and the target range H1 (when the intermediate value B1 enters the target range H1 as a result thereof), the process goes to step S2, thereby to return to the condition that the cumulative number of times N is set to '0' and the control valve 18 is set to the neutral position 18N and the check valves 13, 14 are operated to the opened states (the condition of the hydraulic cylinder 7 functioning as the suspension mechanism).

When the cumulative number of times N reaches the elevating side decision number of times NU1 (exceeds it) (step S19), then, it is determined that the front portion of the vehicle body is being elevated relative to the ground surface. Hence, the control valve 18 will be operated to the lowering position 18D and the check valves 13, 14 will be operated to the operative state (step S21).

With the above, with the pressures of the oil chamber 7*b* of the hydraulic cylinder 7 and the oil passage 10 being maintained at the set pressure MP1 by the relief valve 28, the hydraulic cylinder 7 is contracted to lower the front portion of the vehicle body. When the hydraulic cylinder 7 has been contracted by the amount corresponding to the difference between the intermediate position B1 and the target range H1 (when the intermediate value B1 enters the target range H1 as a result thereof), the process goes to step S2, thereby to return to the condition that the cumulative number of times N is set to '0', and the control valve 18 is set to the neutral position 18N and the check valves 13, 14 are operated to the opened states (the condition of the hydraulic cylinder 7 functioning as the suspension mechanism).

Even after the repeated executions of the steps S4-S11 as described above, if the cumulative number of times N still fails to reach the lowering side decision number of times ND1 (fails to become smaller than it) (step S18) and still fails to reach the elevating side decision number of times NU1 (fails to exceed it) (step S19), then, the condition that the control valve 18 is set to the neutral position 18N and the check valves 13, 14 are operated to the opened states (the condition of the hydraulic cylinder 7 functioning as the suspension mechanism) will be maintained.

[First Alternative Embodiment]

At the steps S4-S8 in FIG. 7, in case the set period T11 is set sufficiently longer to detect a plurality of maximal values A1 and a plurality of minimal values A2, the intermediate value B1 at step S8 in FIG. 7 may be detected in the following manners instead:

(1) For the plurality of maximal values A1 and the plurality of the minimal values A2, one maximal value A1 and one minimal value A2 may be paired, so that the plurality of maximal values A1 and the plurality of the minimal values A2 will be divided into a plurality of such maximal-minimal-value pairs. Then, one intermediate value B1 is detected for each pair, whereby a plurality of intermediate values B1 are detected. Then, an average value of these plural intermediate values B1 may be used as the intermediate value B1 at step S8 in FIG. 7.

(2) For a plurality of maximal values A1, an average value of these maximal values A1 is detected. For a plurality of minimal values A2, an average value of these minimal values A2 is detected. Then, from these average values of the maximal and minimal values A1, A2, an intermediate value B1 is detected, and this may be used as the intermediate value B1 at step S8 in FIG. 7.

[Second Alternative Embodiment]

In the foregoing embodiment, the intermediate value B1 is set as a value intermediate between the maximal and minimal values A1, A2, but this is not limited thereto. Depending on presence/absence of an implement (e.g. a front loader) mounted to the front portion of the vehicle body, a type and/or a mode of operation of the implement, this intermediate value B1 may be a value offset slightly toward the vehicle body elevating side (the expanding side of the hydraulic cylinder 7) from the intermediate value between the maximal and minimal values A1, A2; or may be a value offset slightly toward the vehicle body lowering side (the contracting side of the hydraulic cylinder 7) from the intermediate value between the maximal and minimal values A1, A2.

For instance, in case the implement (e.g. a front loader) is mounted to the front portion of the vehicle body, if the intermediate value B1 is set as a value offset slightly toward the vehicle body elevating side (the expanding side of the hydraulic cylinder 7) from the intermediate value between the maximal and minimal values A1, A2, the vehicle body will be slightly elevated at its front portion relative to the ground surface.

The invention claimed is:

1. A suspension system comprising: a suspension mechanism for a traveling vehicle body;
   a suspension reference position varying mechanism configured to vary a suspension reference position which is a reference position of a suspension stroke of the suspension mechanism;
   a suspension stroke sensor configured to output a detection signal for obtaining the suspension stroke; and
   a controller configured to control the suspension reference position varying mechanism, the controller including:
   a maximal value calculating section for calculating a maximal value corresponding to a maximal position of the suspension stroke each time a control cycle is lapsed, based on the detection signals obtained during a prior set period back from the lapse of said control cycle;
   a minimal value calculating section for calculating a minimal value corresponding to a minimal position of the suspension stroke based on the detection signals;
   an intermediate value calculating section for calculating an intermediate value from the calculated maximal value and the calculated minimal value;
   a time period setting section for setting said prior set period to have a sufficient length to include a plurality of said maximal values and a plurality of said minimal values, said intermediate value being calculated from the greatest one of the plurality of said maximal values and the smallest one of the plurality of said minimal values;
   a target range setting section for setting a target range to be compared with the intermediate value;
   a suspension reference position determining section, the suspension reference position determining section outputting a control command to the suspension reference position varying mechanism for displacing the calculated intermediate value toward a target range when the calculated intermediate value is deviated from the target range; and a hydraulic control amount calculating section for calculating a control amount for the suspension reference position varying mechanism so as to realize the suspension reference position determined by the suspension reference position determining section; and wherein said controller is configured to increase a control execution frequency to the suspension reference position varying mechanism when a traveling speed of the vehicle body is a low speed, and to decrease the control execution frequency when the traveling speed of the vehicle body is a high speed.

2. The suspension system according to claim 1, wherein one maximal value of the plurality of maximal values and one minimal value of the plurality of the minimal values are paired so that the plurality of maximal values and the plurality of the minimal values are divided into a plurality of maximal-minimal-value pairs; and
one intermediate value is calculated for each of the maximal-minimal-value pairs to provide a plurality of the intermediate values, and an average value of the plurality of the intermediate values is calculated to be used as said intermediate value.

3. The suspension system according to claim 1, wherein an average maximal value is calculated from the plurality of the maximal values and an average minimal value is calculated from the plurality of the minimal values; and an average value of the average maximal value and an average value of the plurality of the minimal values is calculated to be used as said intermediate value.

4. A suspension system comprising:
a suspension mechanism for a traveling vehicle body;
a suspension reference position varying mechanism configured to vary a suspension reference position which is a reference position of a suspension stroke of the suspension mechanism;
a suspension stroke sensor configured to output a detection signal for obtaining the suspension stroke; and
a controller configured to control the suspension reference position varying mechanism, the controller including:
a maximal value calculating section for calculating a maximal value corresponding to a maximal position of the suspension stroke each time a control cycle is lapsed, based on the detection signals obtained during a prior set period back from the lapse of said control cycle;
a minimal value calculating section for calculating a minimal value corresponding to a minimal position of the suspension stroke based on the detection signals;
an intermediate value calculating section for calculating an intermediate value from the calculated maximal value and the calculated minimal value;
a target range setting section for setting a target range to be compared with the intermediate value;
a suspension reference position determining section, the suspension reference position determining section outputting a control command to the suspension reference position varying mechanism for displacing the calculated intermediate value toward a target range when the calculated intermediate value is deviated from the target range; and
a hydraulic control amount calculating section for calculating a control amount for the suspension reference position varying mechanism so as to realize the suspension reference position determined by the suspension reference position determining section;

wherein said prior set period is set to have a sufficient length to include a plurality of said maximal values and a plurality of said minimal values, said intermediate value is calculated from the plurality of said maximal values and the plurality of said minimal values;

wherein an average maximal value is calculated from the plurality of the maximal values and an average minimal value is calculated from the plurality of the minimal values; and an average value of the average maximal value and an average value of the plurality of the minimal values is calculated to be used as said intermediate value; and wherein said controller is configured to increase a control execution frequency to the suspension reference position varying mechanism when a traveling speed of the vehicle body is a low speed, and to decrease the control execution frequency when the traveling speed of the vehicle body is a high speed.

* * * * *